United States Patent
Baum et al.

(10) Patent No.: US 11,598,372 B2
(45) Date of Patent: Mar. 7, 2023

(54) BEARING ASSEMBLY FOR A CHARGING APPARATUS

(71) Applicant: BorgWarner Inc., Auburn Hills, MI (US)

(72) Inventors: Christoph Baum, Kaiserslautern (DE); Karl-Ludwig Braun, Otterberg (DE); Thomas Ducker-Schulz, Neu-Bamberg (DE); Panagiotis Koutsovasilis, Mainz (DE); Christian Kramer, Guntersblum (DE); Christian Kunkler, Blieskastel (DE); Ivo Nawrath, Mainz (DE); Erdogan Pektas, Ginsheim-Gustavsburg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/185,305

(22) Filed: Feb. 25, 2021

(65) Prior Publication Data

US 2021/0277942 A1  Sep. 9, 2021

(30) Foreign Application Priority Data

Mar. 3, 2020 (EP) ..................................... 20160681

(51) Int. Cl.
*F16C 33/10* (2006.01)
*F16C 17/02* (2006.01)
*F16C 17/26* (2006.01)

(52) U.S. Cl.
CPC .......... *F16C 33/1045* (2013.01); *F16C 17/02* (2013.01); *F16C 17/26* (2013.01); *F16C 2360/23* (2013.01)

(58) Field of Classification Search
CPC .......... F16C 17/18; F16C 17/26; F16C 27/02; F16C 33/1045; F16C 33/106;
(Continued)

(56) References Cited

U.S. PATENT DOCUMENTS

| 4,640,630 A | 2/1987 | Yoshioka et al. |
| 5,870,894 A | 2/1999 | Woollenweber et al. |

(Continued)

FOREIGN PATENT DOCUMENTS

| CN | 204827541 U | 12/2015 |
| DE | 102017213492 A1 | 2/2019 |

(Continued)

OTHER PUBLICATIONS

English language abstract and machine-assisted English translation for CN 204827541 U extracted from espacenet.com database on Mar. 3, 2021, 11 pages.

(Continued)

*Primary Examiner* — James Pilkington
(74) *Attorney, Agent, or Firm* — Howard & Howard Attorneys PLLC

(57) ABSTRACT

A bearing assembly for a charging apparatus. The bearing assembly comprises a bearing housing and a shaft. The bearing assembly further comprises a compressor-side bearing bushing and a turbine-side bearing bushing which together support the shaft inside a bearing bore of the bearing housing. The bearing assembly is configured to supply unequal amounts of lubricant to a compressor-side outer lubrication gap of the compressor-side bearing bushing and to a turbine-side outer lubrication gap of the turbine-side bearing bushing. The bearing assembly is further configured to supply unequal amounts of lubricant to a compressor-side inner lubrication gap of the compressor-side bearing bushing and to a turbine-side inner lubrication gap of the turbine-side bearing bushing.

16 Claims, 7 Drawing Sheets

(58) Field of Classification Search
CPC .. F16C 2360/23; F16C 2360/24; F01D 25/16; F01D 25/18; F02C 7/06; F05D 2240/53; F05D 2240/54
See application file for complete search history.

(56) References Cited

U.S. PATENT DOCUMENTS

| | | | |
|---|---|---|---|
| 10,161,265 B2 * | 12/2018 | Isayama | F04D 29/051 |
| 10,526,960 B2 * | 1/2020 | Kojima | F01D 25/16 |
| 2008/0098735 A1 | 5/2008 | Gutknecht | |
| 2013/0108483 A1 | 5/2013 | Becker et al. | |
| 2015/0147204 A1 | 5/2015 | Boening et al. | |
| 2017/0045085 A1 * | 2/2017 | Sugiura | F02B 39/14 |
| 2021/0277935 A1 * | 9/2021 | Baum | F01D 25/16 |

FOREIGN PATENT DOCUMENTS

| | | | |
|---|---|---|---|
| JP | S57157817 A | | 9/1982 |
| JP | 2007127063 A | | 5/2007 |
| JP | 2010-127318 | * | 6/2010 |
| WO | 2016028501 A1 | | 2/2016 |

OTHER PUBLICATIONS

Machine-assisted English language abstract and machine-assisted English translation for DE 10 2017 213 492 A1 extracted from espacenet.com database on Mar. 3, 2021, 11 pages.

English language abstract and machine-assisted English translation for JPS 57-157817 A extracted from espacenet.com database on Mar. 3, 2021, 4 pages.

English language abstract and machine-assisted English translation for JP 2007-127063 A extracted from espacenet.com database on Mar. 3, 2021, 8 pages.

* cited by examiner

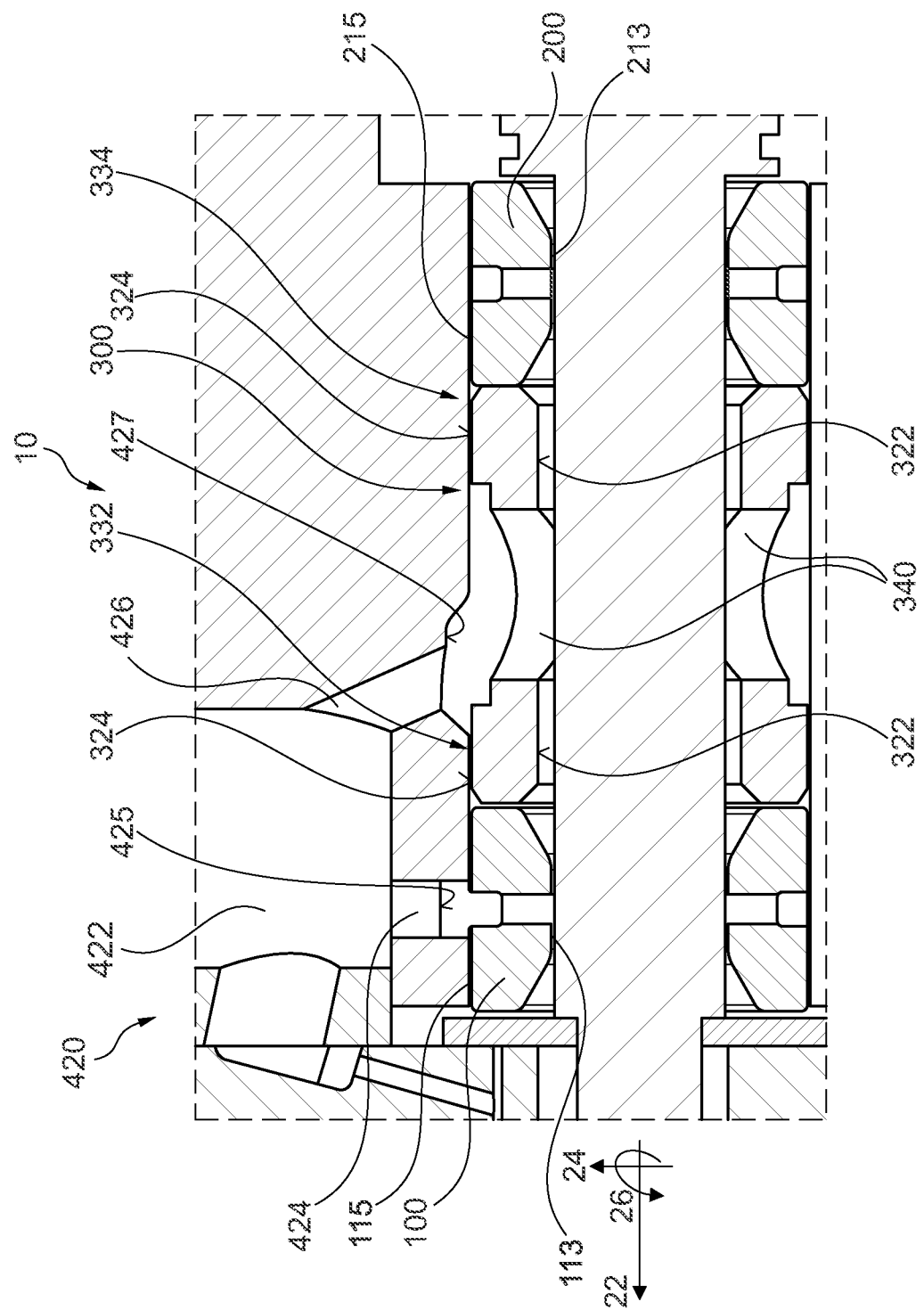

BEARING ASSEMBLY FOR A CHARGING APPARATUS

CROSS-REFERENCE TO RELATED APPLICATIONS

This application claims priority pursuant to 35 U.S.C. 119(a) of European Patent Application No. 20160681.1, filed Mar. 3, 2020, which application is incorporated herein by reference in its entirety.

TECHNICAL FIELD

This disclosure relates to a bearing assembly for a charging apparatus and a charging apparatus comprising such a bearing assembly.

BACKGROUND

The individual mobility sector is experiencing a disruptive change. Especially, the increasing number of electric vehicles entering the market demands higher efficiencies from traditional internal combustion engine (ICE) vehicles. Therefore, more and more vehicles are equipped with efficiency increasing measures, such as charging apparatuses and emission reduction devices. Well known are, for instance, charging apparatuses wherein a compressor may be driven by an e-motor (e-charger) and/or an exhaust gas powered turbine (turbocharger). Generally, an exhaust gas turbocharger has a turbine with a turbine wheel, which is driven by the exhaust gas flow of the combustion engine. A compressor with a compressor wheel is arranged on a common shaft with the turbine wheel in the case of an exhaust gas turbocharger and with an e-motor in the case of an e-charger, respectively. The compressor compresses the fresh air which is drawn in for the engine. This increases the amount of air or oxygen available to the engine for combustion. This in turn increases the performance of the combustion engine.

In many known charging apparatuses, the shaft is mounted in a bearing housing via a hydrodynamic bearing assembly. The bearing assembly regularly comprise a compressor-side bearing bushing and a turbine-side (or e-motor-side) bearing bushing which surround the shaft in a bearing bore of the bearing housing. Thereby, the shaft is radially supported. In common bearing assemblies, lubricant, for instance oil is provided to the bearing assembly to build up a hydrodynamic bearing film between the bushings and the bearing bore, and between the shaft and the bushings, respectively. In that, a semi-floating or full-floating bearing is achieved.

In the state of the art, various bearing assemblies for charging apparatuses suffer from insufficient rotor stability and low performance of constant tone and unbalance acoustics. Therefore, one of the main challenges of these bearing assemblies is to improve the noise vibration and harshness (NVH) behavior of the bearing assembly. This task is crucial, as a suboptimal NVH behavior may propagate through the structure, may thereby adversely affect the whole charging apparatus and may eventually lead to a complete system failure.

Accordingly, the objective of the present invention is to provide a bearing assembly for a charging apparatus with improved NVH behavior.

SUMMARY

The present invention relates to a bearing assembly for a charging apparatus. Furthermore, the invention relates to a charging apparatus having such a bearing assembly. Other configurations are described herein.

The inventive bearing assembly for a charging apparatus comprises a bearing housing, a shaft, a compressor-side bearing bushing and a turbine-side bearing bushing. The compressor-side bearing bushing and the turbine-side bearing bushing together support the shaft inside a bearing bore of the bearing housing. The bearing assembly forms a compressor-side inner lubrication gap and a compressor-side outer lubrication gap at the compressor-side bearing bushing, and a turbine-side inner lubrication gap and a turbine-side outer lubrication gap at the turbine-side bearing bushing. The bearing assembly is configured such that the inner and/or outer lubrication gap of the compressor-side bearing bushing is supplied with an unequal amount of lubrication than the inner and/or outer lubrication gap of the turbine-side bearing bushing. The main effect which can be achieved by supplying unequal amounts of lubricant to the lubrication gaps of the bearing bushings is that different lubricant film temperatures and viscosities are built up in the respective lubrication gap at the compressor-side bearing bushing and at the turbine-side bearing bushing, respectively. Due to the unequal lubricant film temperatures, the transmission of drive torque between the shaft and the bearing bushings is different (and also the breaking torque between the bearing bushings and the bearing housing may be effectuated) which causes the bearing bushings to rotate at different rotation speeds. For instance, a higher lubricant film temperature in the inner lubrication gap leads to a decreased drive torque transmission between the shaft and the respective bearing bushing which in turn leads to a slower rotation of the respective bearing bushing during acceleration of the shaft and to a faster rotation of the respective bearing bushing during deceleration of the shaft. A lower lubricant film temperature in the inner lubrication gap leads analogously to the opposite effect. A higher lubricant film temperature in the outer lubrication gap leads to a decreased breaking torque due to decreased shear forces of the lubricant between the bearing housing and the respective bearing bushing which in turn leads to a faster rotation of the respective bearing bushing during acceleration and during deceleration of the shaft. A lower lubricant film temperature in the outer lubrication gap leads analogously to the opposite effect, i.e. a higher breaking torque which decelerates the respective bearing bushing. Consequently, these effects lead to the advantage that synchronization effects of lubricant film vibrations can be prevented. By disturbing the superposition of natural frequencies of the lubricant, i.e. by disturbing synchronization effects, the acoustic and vibration transfer into the periphery can be limited, and thus, an improved NVH behavior can be achieved.

In a first embodiment, the compressor-side outer lubrication gap of the compressor-side bearing bushing may be smaller than the turbine-side outer lubrication gap of the turbine-side bearing bushing. Thereby, different amounts of lubricant are present at the bearing bushings which leads to unequal breaking torques due to unequal shear forces in the lubricant film on the compressor-side bearing bushing and on the turbine-side bearing bushing, respectively. The unequal breaking torques cause the bearing bushings to rotate at different speeds. In that, the superposition of natural frequencies of the lubricant can be disturbed, i.e. synchronization effects can be prevented. In an optional aspect of this first embodiment, it is particularly advantageous if the turbine-side outer lubrication gap is configured larger compared to the standard configuration of the turbine-side outer lubrication gap as this leads in a synergetic way to an improved cooling effect on the turbine-side bearing bushing.

In another aspect of the first refinement, which is combinable with the previous aspect, a difference between the compressor-side outer lubrication gap and the turbine-side outer lubrication gap may at room temperature be at least 6.5% and preferably around 10% of the compressor-side outer lubrication gap. More precisely, the difference between a minimum compressor-side outer lubrication gap and a minimum turbine-side outer lubrication gap may at room temperature be at least 6.5% and preferably around 10% of the minimum compressor-side outer lubrication gap. The difference between the minimum compressor-side outer lubrication gap and the minimum turbine-side outer lubrication gap should preferably not be more than 35% of the minimum compressor-side outer lubrication gap. Alternatively, a difference between an average compressor-side outer lubrication gap and an average turbine-side outer lubrication gap may at room temperature be at least 5.5% and preferably at least 8.5% of the average compressor-side outer lubrication gap. The difference between the average compressor-side outer lubrication gap and the average turbine-side outer lubrication gap should preferably not be more than 25% of the average compressor-side outer lubrication gap. Having a targeted difference between the minimum gaps of around or at least 10% leads a particular effective prevention of synchronization effects. A minimum outer lubrication gap is to be understood as the minimum acceptable outer lubrication gap due to manufacturing tolerances. Analogously, an average outer lubrication gap will be understood by the skilled person as the outer lubrication gap based on the targeted dimensions without considering manufacturing tolerances.

In another aspect of the first embodiment, which is combinable with any one of the previous aspects, the compressor-side inner lubrication gap of the compressor-side bearing bushing may be equal to the turbine-side inner lubrication gap of the turbine-side bearing bushing. Thereby, tilting of the shaft is prevented or at least reduced which consequently leads to an improved motion and stabilization of the shaft whilst still preventing synchronization effects.

In a second embodiment, which is combinable with the previous embodiment, a depth of a compressor-side circumferential lubricant groove of a compressor-side bearing bushing may be different than a depth of a turbine-side circumferential lubricant groove of the turbine-side bearing bushing. The different depths of the circumferential lubricant grooves affect lubricant supply bores of the bearing bushings such that bore depths of the lubricant supply bores are different on the compressor-side bearing bushing and the turbine-side bearing bushing. This leads to different lever arms of the lubricant inside the lubricant supply bores and thereby to different centrifugal forces and counter pressures in lubricant supply bores of the compressor-side bearing bushing and the turbine-side bearing bushing, respectively. Consequently, different amounts of lubricant are present in the respective inner and outer lubrication gaps due to different lubricant throughputs. Thereby unequal lubricant film temperatures and viscosities are built up at the compressor-side bearing bushing and at the turbine-side bearing bushing, respectively. Due to the unequal lubricant film temperatures, the transmission of drive torque between the shaft and the bearing bushings is different (and also the breaking torque between the bearing bushings and the bearing housing may be effectuated) which causes the bearing bushings to rotate at different speeds. In that, the superposition of natural frequencies of the lubricant can be disturbed, i.e. the synchronization effects can be prevented.

In an aspect of the second embodiment, the depth of the turbine-side circumferential lubricant groove may be smaller than the depth of the compressor-side circumferential lubricant groove. This leads to a reduced lubricant throughput to the inner lubrication gap at the turbine-side bearing bushing which again leads to a decreased drive torque transmission between the shaft and the turbine-side bearing bushing due to a higher lubricant film temperature in the inner lubrication gap of the turbine-side bearing bushing compared to the compressor-side bearing bushing. Alternatively or additionally, the depth of the turbine-side circumferential lubricant groove may be 5% to 90%, preferably 15% to 80% and most preferably 25% to 50% smaller than the depth of the compressor-side circumferential lubricant groove.

In another aspect of the second embodiment and alternatively to the previous aspect, the depth of the compressor-side circumferential lubricant groove may be smaller than the depth of the turbine-side circumferential lubricant groove. This leads to a reduced lubricant throughput to the inner lubrication gap at the compressor-side bearing bushing which again leads to a decreased drive torque transmission between the shaft and the compressor-side bearing bushing due to a higher lubricant film temperature in the inner lubrication gap of the compressor-side bearing bushing compared to the turbine-side bearing bushing. Alternatively or additionally, the depth of the compressor-side circumferential lubricant groove may be 5% to 90%, preferably 15% to 80% and most preferably 25% to 50% smaller than the depth of the turbine-side circumferential lubricant groove.

In a third embodiment, which is combinable with any one of the previous embodiments, a number of lubricant supply bores of the compressor-side bearing bushing may be different than a number lubricant supply bores of the turbine-side bearing bushing. By the provision of different numbers of lubricant supply bores on the compressor-side bearing bushing and on the turbine-side bearing bushing, a different lubricant throughput is achieved on the turbine side than on the compressor side. This results in different throttle effects from the outer circumference of the respective bearing bushing to the inner circumference of the respective bearing bushing and thereby leads to different amounts of lubricant in the inner lubrication gaps. Consequently, different lubricant film temperatures and viscosities are built up in the inner lubrication gaps and thereby the transmission of drive torque between the shaft and the bearing bushings is different which causes the bearing bushings to rotate at different speeds. In that, the superposition of natural frequencies of the lubricant can be disturbed, i.e. the synchronization effects can be prevented.

In an aspect of the third embodiment, the number of lubricant supply bores of the compressor-side bearing bushing may be smaller than the number lubricant supply bores of the turbine-side bearing bushing. Alternatively or additionally, the compressor-side bearing bushing may comprise at least one lubricant supply bore less than the turbine-side bearing bushing. Alternatively or additionally, the compressor-side bearing bushing may comprise at least two lubricant supply bores less than the turbine-side bearing bushing. Alternatively or additionally, the compressor-side bearing bushing may comprise four lubricant supply bores and the turbine-side bearing bushing comprises six lubricant supply bores.

In another aspect of the third embodiment and alternatively to the previous aspect, the number lubricant supply bores of the compressor-side bearing bushing may be larger than the number lubricant supply bores of the turbine-side bearing bushing. Alternatively or additionally, the compressor-side bearing bushing may comprise at least one lubricant supply bore more than the turbine-side bearing bushing. Alternatively or additionally, the compressor-side bearing bushing may comprise at least two lubricant supply bores more than the turbine-side bearing bushing. Alternatively or additionally, the compressor-side bearing bushing comprises six lubricant supply bores and the turbine-side bearing bushing comprises four lubricant supply bores.

In a fourth embodiment, which is combinable with any one of the previous embodiments, the bearing housing comprises a lubricant supply system with a first supply channel and a second supply channel. The first supply channel opens into an inner surface of the bearing bore at an axial position of the turbine-side bearing bushing or at an axial position of the compressor-side bearing bushing. The second supply channel opens into the inner surface of the bearing bore axially between the compressor-side bearing bushing and the turbine-side bearing bushing. Thereby, that bearing bushing at whose axial position the first supply channel opens into the inner surface of the bearing bore is supplied with more lubricant than the other bearing bushing. That means, the other bearing bushing is only supplied indirectly with lubricant from the second supply channel whereby less lubricant is in its outer lubrication gap. This leads to a higher lubricant temperature in this outer lubrication gap and thereby to less breaking torque which causes this bearing bushing to rotate at a faster rotation speed during operation. That means, different amounts of lubricant are present at the bearing bushings, in particular in their outer lubrication gaps, which leads to unequal breaking torques due to unequal shear forces in the lubricant film on the compressor-side bearing bushing and on the turbine-side bearing bushing, respectively. The unequal breaking torques cause the bearing bushings to rotate at different speeds. In that, the superposition of natural frequencies of the lubricant can be disturbed, i.e. synchronization effects can be prevented.

In an aspect of the fourth embodiment, the first supply channel may be fluidically coupled directly to one of the turbine-side bearing bushing or the compressor-side bearing bushing. The second supply channel may be fluidically coupled directly to a spacer which is arranged axially between the compressor-side bearing bushing and the turbine-side bearing bushing.

In another aspect of the fourth embodiment which is combinable with the previous aspect, the lubricant supply system may further comprise a lubricant chamber. The first supply channel may fluidically couple the lubricant chamber directly to one of the turbine-side bearing bushing or the compressor-side bearing bushing. The second supply channel may fluidically couple the lubricant chamber directly to the spacer. Additionally, the second supply channel may extend from the lubricant chamber to an outer jacket surface of the spacer.

In another aspect of the fourth embodiment which is combinable with any one of the previous aspects, the spacer may comprise a lubricant supply bore which extends from the outer jacket surface of the spacer to an inner jacket surface of the spacer. Additionally, the lubricant supply bore may be arranged axially between a compressor-side land and a turbine-side land of the spacer. Additionally or alternatively, the second supply channel may extend from the lubricant chamber to the lubricant supply bore of the spacer. Additionally or alternatively, the second supply channel may extend from the lubricant chamber to the compressor-side land. Alternatively, the second supply channel may extend from the lubricant chamber to the turbine-side land.

In another aspect of the fourth embodiment which is combinable with any one of the previous aspects, the first supply channel may extend to an outer jacket surface of the turbine-side bearing bushing. Additionally or alternatively, the first supply channel may extend from the lubricant chamber to the outer jacket surface of the turbine-side bearing bushing. Alternatively, the first supply channel may extend to an outer jacket surface of the compressor-side bearing bushing. Additionally or alternatively, the first supply channel may extend from the lubricant chamber to the outer jacket surface of the compressor-side bearing bushing.

In another aspect of the fourth embodiment which is combinable with any one of the previous aspects, no direct lubricant supply may be provided to one of the compressor-side bearing bushing or the turbine-side bearing bushing. In other words, this means that lubricant is only supplied to one of the compressor-side bearing bushing or the turbine-side bearing bushing. To the other bearing bushing lubricant is only indirectly supplied.

In another aspect of the fourth embodiment which is combinable with any one of the previous aspects, the first supply channel may open into an inner surface of a first supply groove provided on the inner surface of the bearing bore. Additionally or alternatively, the second supply channel may open into a second supply groove provided on the inner surface of the bearing bore.

In another aspect which is combinable with any one of the previous embodiments and aspects, each of the compressor-side bearing bushing and the turbine-side bearing bushing may be a full-floating bushing type.

In another aspect which is combinable with any one of the previous embodiments and aspects, the shaft may rotatably couple a turbine wheel of a turbine to an impeller of a compressor.

In another aspect which is combinable with any one of the previous embodiments and aspects, the bearing assembly may further comprise a spacer. The spacer may be arranged axially between the compressor-side bearing bushing and the turbine-side bearing bushing.

In another aspect which is combinable with any one of the previous embodiments and aspects, the compressor-side bearing bushing may comprise a plurality of lubricant supply bores. Additionally or alternatively, the turbine-side bearing bushing may comprise a plurality of lubricant supply bores.

In another aspect which is combinable with any one of the previous embodiments and aspects, the compressor-side bearing bushing may comprise a circumferential lubricant groove. Additionally or alternatively, the turbine-side bearing bushing may comprise a circumferential lubricant groove.

In another aspect which is combinable with any one of the previous embodiments and aspects, the bearing housing may comprise a first supply groove provided on an inner surface of the bearing bore. Additionally, the bearing housing may comprise a second supply groove provided on the inner surface of the bearing bore.

The present invention further relates to a charging apparatus. The charging apparatus comprises a compressor with a compressor housing and an impeller. The impeller is mounted rotatably in the compressor housing. The charging apparatus further comprises a drive unit which is rotatably coupled to the impeller via a shaft of the charging apparatus. Additionally, the charging apparatus further comprises a bearing assembly of any one of the previous embodiments and aspects which rotatably supports the shaft. Additionally, the drive unit may comprise a turbine configured to drive the shaft. Additionally or alternatively, the drive unit may comprise an electric motor configured to drive the shaft.

BRIEF DESCRIPTION OF THE DRAWINGS

FIG. 5 show a detailed sectional view of the bearing assembly according to a fourth embodiment with different oil supply channels;

DETAILED DESCRIPTION

In the context of this invention, the expressions axially, axial or axial direction is a direction parallel of or along a rotation axis of the shaft or the bearing bushings which are generally arranged coaxial. Thus, with reference to the figures, see, especially FIGS. 1, 2, and 5, an axial dimension (axial direction) is described with reference sign 22, a radial dimension (radial direction) extending "radially" away from the axial dimension 22 is described with reference sign 24. Furthermore, a circumferential dimension (circumferential direction) around the axial dimension 22 is described with reference sign 26.

In consistency with the nomenclature further above, the various features and configurations of present invention is subsequently explained using the expressions embodiments and aspects (i.e. a configuration). It is noted that all aspects of one respective embodiment are combinable with any aspect of other embodiments in order to synergistically enhance the above described advantageous effects. In the following some general features will be described which account for all embodiments including (i.e. these features account for all aspects). Thereafter each embodiment will be described separately by means of the respective figure(s) showing the corresponding embodiment.

Figure 1:
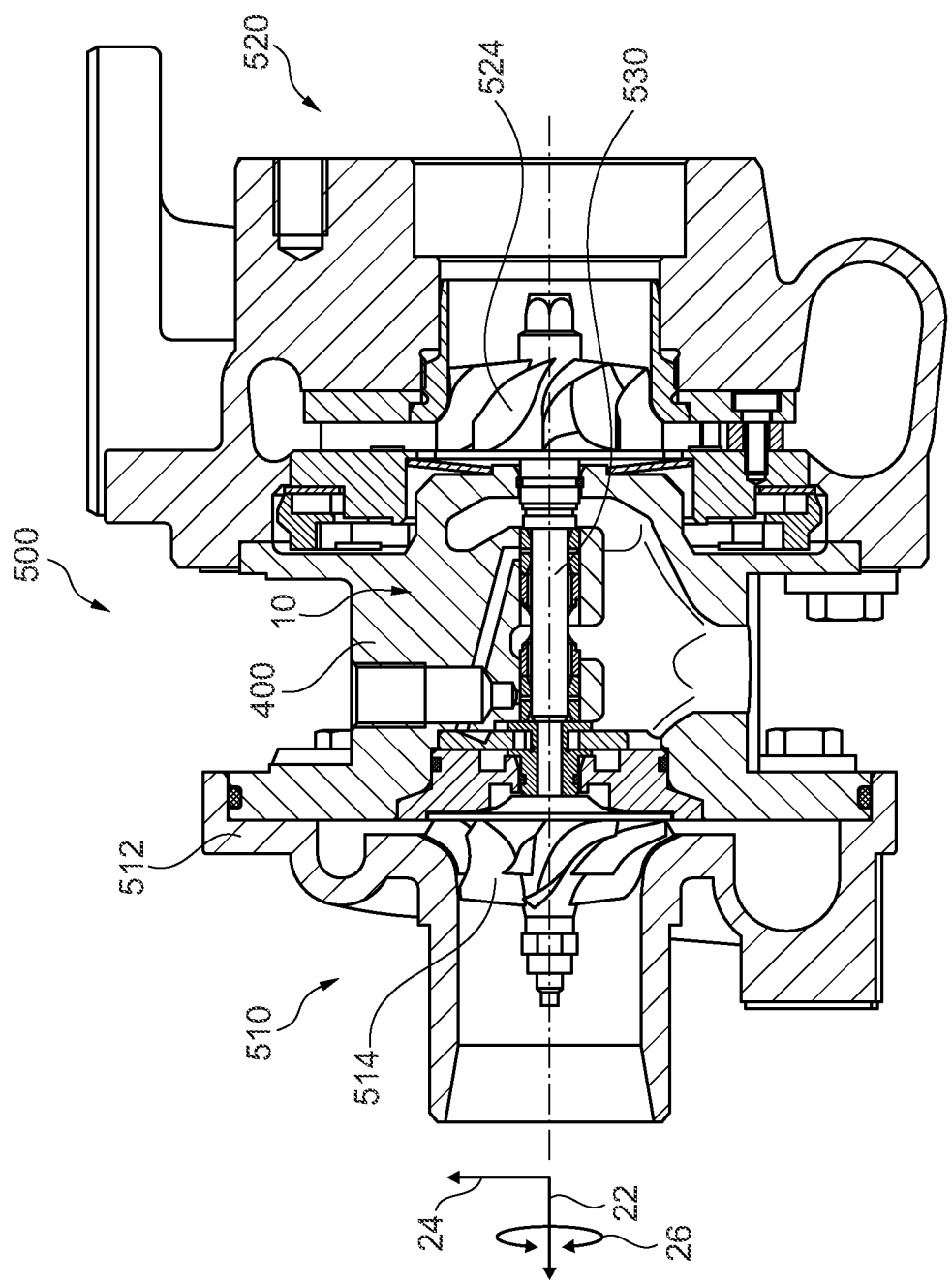
FIG. 1 shows a sectional side view of an exemplary charging apparatus.

FIG. 1 illustrates an exemplary configuration of a charging apparatus 500 including the inventive bearing assembly 10. The charging apparatus 500 comprises a compressor 510 with a compressor housing 512 and an impeller 514 which is mounted rotatably in the compressor housing 512. In the present example, the charging apparatus 500 comprises a turbine 520 as a drive unit. In other configurations, the drive unit may additionally comprise an electric motor or may only consist of an electric motor. The turbine 520 comprises a turbine wheel 524 which is rotatably coupled to the impeller 514 via a shaft 530. The shaft 530 is rotatably supported in a bearing housing 400 via the bearing assembly 10.

In the following, some general aspects of the bearing assembly will be described which may be comprised by any of the presently disclosed bearing assemblies 10. These aspects will be described by means of certain figures and may also be visible only in certain figures, however, these general aspects may concern each of the inventive bearing assemblies. Thereby, it is not meant that each of these general aspects is necessarily essential for each embodiment and main aspect.

Figure 2:
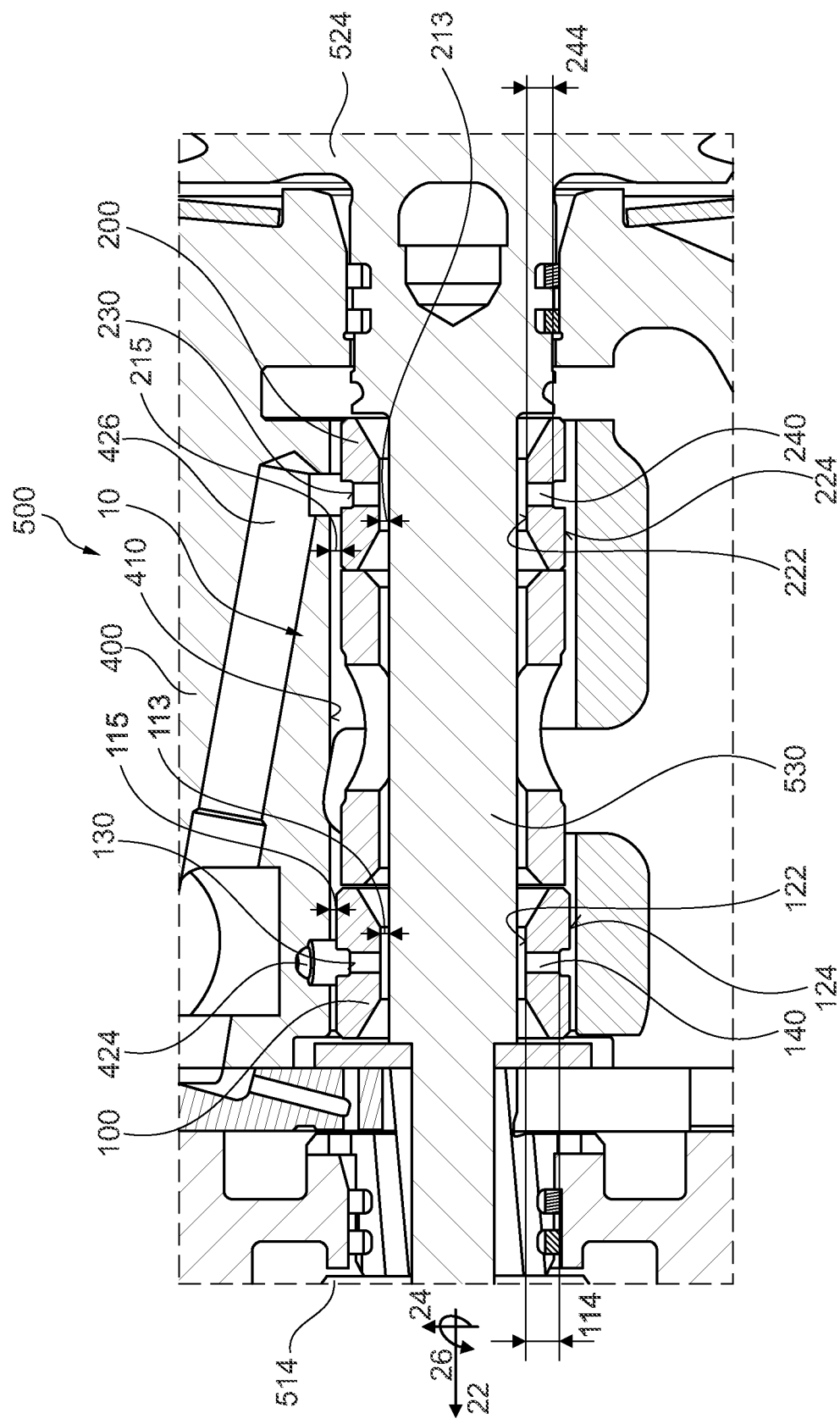
FIG. 2 shows a detailed sectional view of the bearing assembly according to a first embodiment with different outer lubrication gaps.

As illustrated in FIG. 2, the bearing assembly 10 for a charging apparatus 500 comprises the bearing housing 400, the shaft 530, a compressor-side bearing bushing 100 and a turbine-side bearing bushing 200. The bearing assembly 10 is configured as a radial bearing assembly. The compressor-side bearing bushing 100 and the turbine-side bearing bushing 200 together support the shaft 530 inside a bearing bore 410 of the bearing housing 400. In the present example, each of the compressor-side bearing bushing 100 and the turbine-side bearing bushing 200 are a full-floating bushing type. That means, inner lubrication gaps 113, 213 (i.e. radial inner lubrication gaps 113, 213) are provided radially between the bearing bushings 100, 200 and the shaft 530. That means, the lubrication gap 113 between the compressor-side bearing bushing 100 and the shaft 530 is the inner lubrication gap 113 of the compressor-side bearing bushing 100 and is also called compressor-side inner lubrication gap 113. Analogously, the lubrication gap 213 between the turbine-side bearing bushing 200 and the shaft 530 is the inner lubrication gap 213 of the turbine-side bearing bushing 200 and is also called turbine-side inner lubrication gap 213. Furthermore, outer lubrication gaps 115, 215 (i.e. radial outer lubrication gaps 115, 215) are provided radially between the bearing bushings 100, 200 and the bearing housing 400. That means, the lubrication gap 115 between the compressor-side bearing bushing 100 and the bearing housing 400 is the outer lubrication gap 115 of the compressor-side bearing bushing 100 and is also called compressor-side outer lubrication gap 115. Analogously, the lubrication gap 215 between the turbine-side bearing bushing 200 and the bearing housing 400 is the outer lubrication gap 215 of the turbine-side bearing bushing 200 and is also called turbine-side outer lubrication gap 215. Although, not solidly connected, some drive torque may be transmitted from the shaft 530 to the bearing bushings 100, 200 during operation such that the bearing bushings 100, 200 also rotate during operation to a certain extent. Each bearing bushing 100, 200 comprises an inner jacket surface 122, 222 and an outer jacket surface 124, 224. That means the compressor-side bearing bushing 100 comprises an outer jacket surface 124 which is also called a compressor-side outer jacket surface 124. The inner jacket surface 122 of the compressor-side bearing bushing 100 is also called a compressor-side inner jacket surface 122. Analogously, the turbine-side bearing bushing 200 comprises an outer jacket surface 224 which is also called a turbine-side outer jacket surface 224. The inner jacket surface 222 of the turbine-side bearing bushing 200 is also called a turbine-side inner jacket surface 222. More precisely, the respective inner jacket surface 122, 222 is a radially inner jacket surface 122, 222. Between the respective inner jacket surface 122, 222 and the shaft 530, the respective inner lubrication gap 113, 213 is provided. Analogously, the respective outer jacket surface 124, 224 is a radially outer jacket surface 124, 224. Between the respective outer jacket surface 124, 224 and an inner surface 412 of the bearing bore 410, the respective outer lubrication gap 115, 215 is provided. As already mentioned, the shaft 530 rotatably couples the turbine wheel 524 of the turbine 520 to the impeller 514 of the compressor 510.

The bearing assembly 10 further comprises a spacer 300 which is arranged axially between the compressor-side bearing bushing 100 and the turbine-side bearing bushing 200. In the present example, the spacer 300 is configured as a sleeve. The spacer 300 is arranged axially between the compressor-side bearing bushing 100 and the turbine-side bearing bushing 200 (see, FIG. 5). The spacer 300 comprises an outer jacket surface 324 and an inner jacket surface 322. More precisely, the inner jacket surface 322 is a radially inner jacket surface 322. Analogously, the outer jacket surface 324 is a radially outer jacket surface 324. Two lubricant supply bores 340 are formed in the spacer 300. The two lubricant supply bores 240 are arranged at opposing sides of the spacer 300, i.e. 180° displaced in the circumferential direction 26. Furthermore, the lubricant supply bores 340 arranged centrally with respect to the width of the spacer 300 in the axial direction 22. In alternative configurations, the lubricant supply bores 340 may also be displaced with respect to each other by a different amount than 180° in the circumferential direction 26. Furthermore, the lubricant supply bores 340 may alternatively be arranged not centrally in the spacer 300 but closer to the compressor-sider bearing bushing 100 or closer to the turbine-side bearing bushing 200. In alternative configurations only one or more than two lubricant supply bores 340 may be formed in the spacer 300 (not shown). The lubricant supply bore 340 extends from the outer jacket surface 324 of the spacer 300 to the inner jacket surface 322 of the spacer 300. Thereby, right and left of the lubricant supply bore 340 (i.e. axially adjacent to the lubricant supply bore 340) as seen in FIG. 5, a respective bearing land 332, 334 is provided on the spacer 300. More specifically, a compressor-side land 332 and a turbine-side land is provided on the outer jacket surface 324 of the spacer 300. In other configurations (not shown), the spacer 300 may be alternatively configured as any other distance keeping device, e.g. one or more pins, disks or keys or the like, to keep both bearing bushings 100, 200 axially distanced.

Each bearing bushing 100, 200 comprises at least one lubricant supply bore 140, 240. In FIG. 2, the compressor-side bearing bushing 100 and also the turbine-side bearing bushing 200 respectively comprise a plurality of supply bores 140, 240 (although only two are visible, respectively). For instance, in FIGS. 4A and 4B a plurality of lubricant supply bores 140, 240 is visible. The lubricant supply bores 140, 240 extend radially through the respective bearing bushing 100, 200 as is visible, for instance in FIG. 2. The compressor-side bearing bushing 100 and the turbine-side bearing bushing 200 each comprise a circumferential lubricant groove 130, 230 (see, e.g. FIG. 2). The circumferential lubricant groove 130, 230 extends along an outer circumference 114, 214 of the respective bearing bushing 100, 200. Explained in other words, the circumferential lubricant groove 130, 230 is a ring groove arranged on the respective outer jacket surface 124, 224 and extending in the circumferential direction 26. That means, the circumferential lubricant groove 130, 230 is arranged on (i.e. axially recessed in) the respective outer jacket surface 124, 224 of the bearing bushings 100, 200 (see, e.g. FIG. 2). However, in other configurations, no or more than one (for instance, two or three) circumferential lubricant groove 130, 230 may be provided in one or both of the bearing bushings 100, 200 (see, e.g. FIGS. 4A and 4B).

Figure 3A:
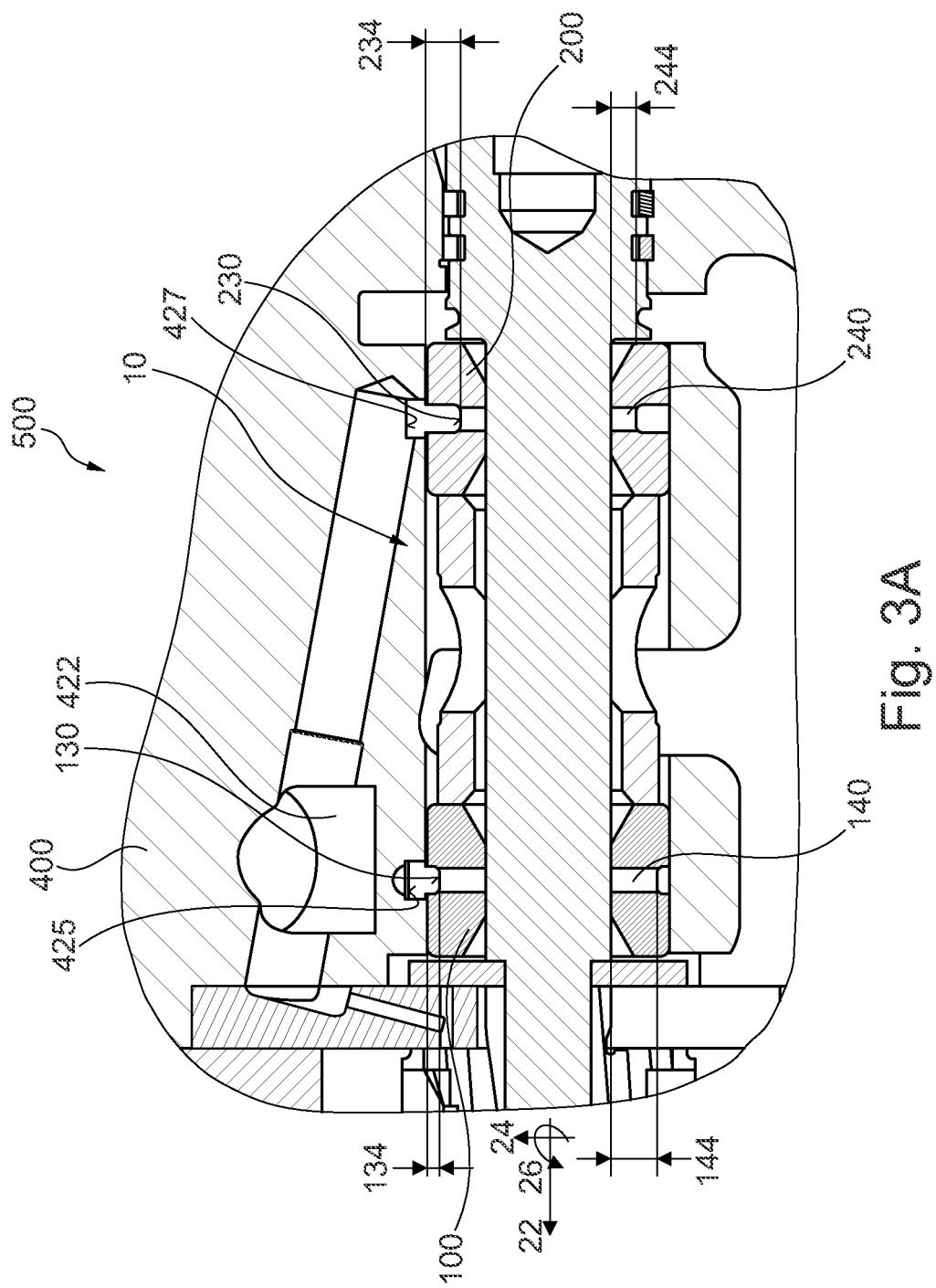
FIGS. 3A-3B show detailed sectional views of the bearing assembly according to a second embodiment with different lubricant groove depths.

The bearing housing 400 comprises a lubricant supply system 420 with a first lubricant supply channel 424 and a second lubricant supply channel 426 to provide lubricant to the bearing bore 410 (see, FIGS. 2, 3A and 5). The lubricant supply channels 424, 426 may open directly into the bearing bore 410 through the inner surface 412 or may open into a first supply groove 425 and a second supply groove 427 provided on the inner surface 412 (see, FIGS. 2 and 3A). The lubricant supply grooves 425, 427 extend in the circumferential direction 26. Thus, the lubricant supply grooves 425, 427 are circumferential lubricant supply grooves 425, 427. Thereby, lubricant supply around the circumference can be improved. However, in alternative configurations, the lubricant may be supplied directly to the inner surface 412 of the bearing bore 410 from the respective lubricant supply channel 424, 426 (see, FIGS. 2 and 3A). The lubricant supply system 420 further comprises a lubricant chamber 422 from which the lubricant supply channels 424, 426 extend to the bearing bore 410 (see, e.g. FIG. 5). In alternative configurations (not shown), the lubricant supply system 420 may not comprise a lubricant chamber 422. In these configurations, the lubricant supply channels 424, 426 may be independently fed with lubricant.

All embodiments of the present invention further have in common that the bearing assembly 10 is configured such that the inner and/or outer lubrication gap 113, 115 of the compressor-side bearing bushing 100 (also called compressor-side inner lubrication gap 113 and compressor-side outer lubrication gap 115) is supplied with a different amount of lubrication than the inner and/or outer lubrication gap 213, 215 of the turbine-side bearing bushing 200 (also called turbine-side inner lubrication gap 213 and turbine-side outer lubrication gap 215). The main effect which can be achieved by supplying unequal amounts of lubricant to the lubrication gaps 113, 213, 115, 215 of the bearing bushings 100, 200 is that different lubricant film temperatures and viscosities are built up in the respective lubrication gap 113, 213, 115, 215 at the compressor-side bearing bushing 100 and at the turbine-side bearing bushing 200, respectively. Due to the unequal lubricant film temperatures, the transmission of drive torque between the shaft 530 and the bearing bushings 100, 200 is different (and also the breaking torque between the bearing bushings 100, 200 and the bearing housing 400 may be effectuated) which causes the bearing bushings 100, 200 to rotate at different rotation speeds. For instance, a higher lubricant film temperature in the inner-lubrication gap 113, 213 leads to a decreased drive torque transmission between the shaft 530 and the respective bearing bushing 100, 200 which in turn leads to a slower rotation of the respective bearing bushing 100, 200 during acceleration of the shaft 530 and to a faster rotation of the respective bearing bushing 100, 200 during deceleration of the shaft 530. A lower lubricant film temperature in the inner lubrication gap 113, 213 leads analogously to the opposite effect. A higher lubricant film temperature in the outer-lubrication gap 115, 215 leads to a decreased breaking torque due to decreased shear forces of the lubricant between the bearing housing 400 and the respective bearing bushing 100, 200 which in turn leads to a faster rotation of the respective bearing bushing 100, 200 during acceleration and during deceleration of the shaft 530. A lower lubricant film temperature in the outer lubrication gap 115, 215 leads analogously to the opposite effect, i.e. a higher breaking torque which decelerates the respective bearing bushing 100, 200. Consequently, these effects lead to the advantage that synchronization effects of lubricant film vibrations can be prevented. By disturbing the superposition of natural frequencies of the lubricant, i.e. by disturbing synchronization effects, the acoustic and vibration transfer into the periphery can be limited, and thus, an improved NVH behavior can be achieved.

In the first embodiment which is depicted in FIG. 2, the compressor-side outer lubrication gap 115 is smaller than the turbine-side outer lubrication gap 215. For illustrative purposes the dimensions of the inner and outer lubrication gaps 113, 213, 115, 215 are depicted enlarged. However, it is to be understood that this is only a schematic illustration and that the inner and outer lubrication gaps 113, 213, 115, 215 are smaller in reality and, especially, that the compressor-side outer lubrication gap 115 is smaller than the turbine-side outer lubrication gap 215. Thereby, different amounts of lubricant are present at the bearing bushings 100, 200, i.e. less lubricant is present in the compressor-side outer lubrication gap 115 than in the turbine-side outer lubrication gap 215. This leads to a larger breaking torque on the compressor-side bearing bushing 100 than on the turbine-side bearing bushing 200 due to higher shear forces in the lubricant film (in the outer lubrication gap 130). Due to the larger breaking torque at the compressor-side bearing bushing 100 (more precisely in the compressor-side outer lubrication gap 115) than at the turbine-side bearing bushing 200 (more precisely in the turbine-side outer lubrication gap 215), the compressor-side bearing bushing 100 rotates slower during operation of the bearing assembly 10 than the turbine-side bearing bushing 200. In that, the superposition of natural frequencies of the lubricant can be disturbed, i.e. synchronization effects can be prevented. Thereby, it is particularly advantageous that the turbine-side outer lubrication gap 215 is configured larger compared to the standard configuration of the turbine-side outer lubrication gap 215 as this leads in a synergetic way to an improved cooling effect on the turbine-side bearing bushing. The compressor-side inner lubrication gap 113 is equally sized as the turbine-side inner lubrication gap 213. Thereby, tilting of the shaft 530 is prevented or at least reduced which consequently leads to an improved motion and stabilization of the shaft 530 whilst still preventing synchronization effects.

Figure 3B:
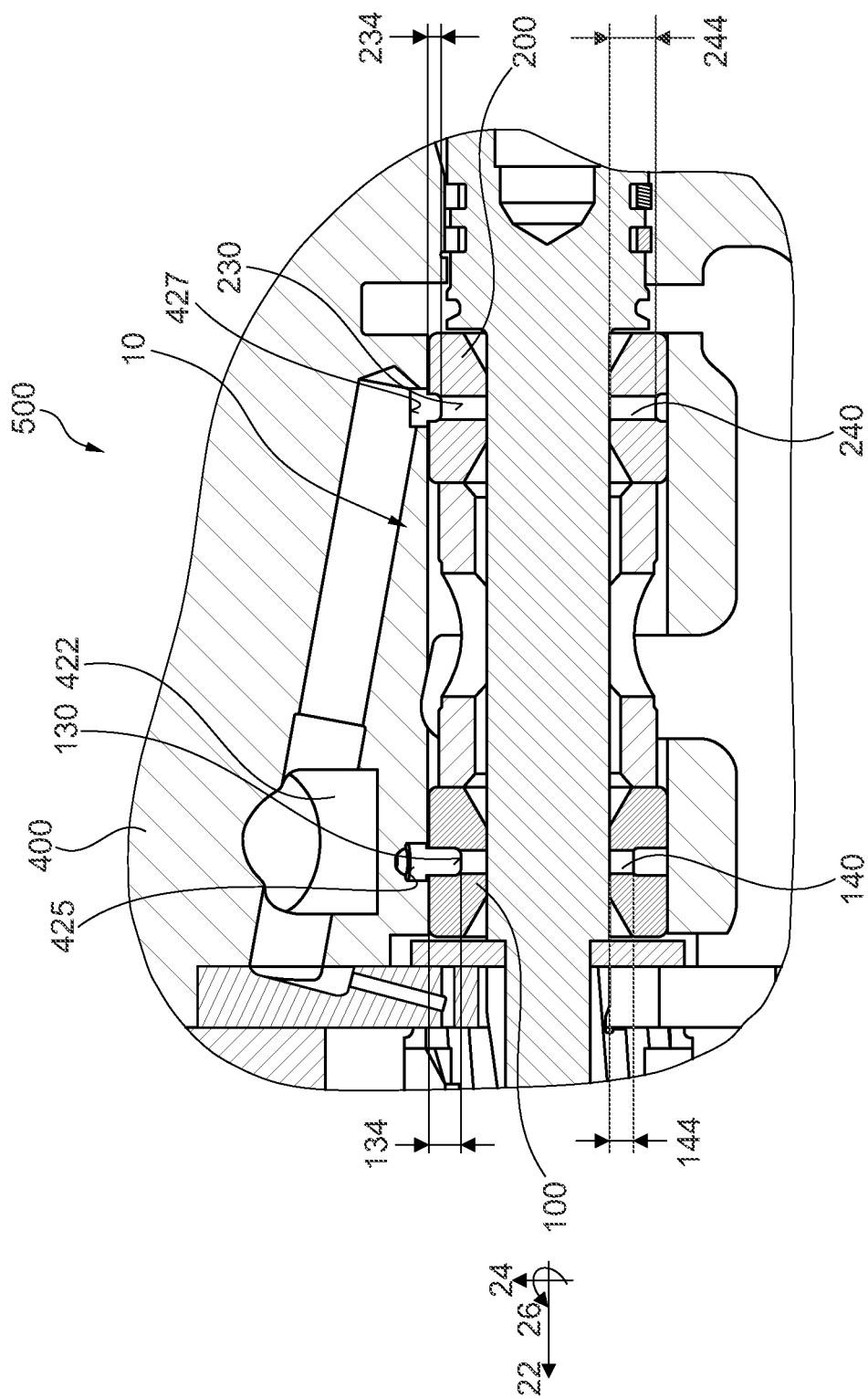

In the second embodiment which is depicted in FIGS. 3A-3B, a depth 134 of the compressor-side circumferential lubricant groove 130 is configured differently than a depth 234 of the turbine-side circumferential lubricant groove 230. The respective depth 134, 234 is thereby to be understood as a length/dimension in the radial direction 24. The different depths 134, 234 of the circumferential lubricant grooves 130, 230 affect the lubricant supply bores 140, 240 of the bearing bushings 100, 200 such that respective bore depths 144 of the lubricant supply bores 140 are different on the compressor-side bearing bushing 100 from respective bore depths 244 of the lubricant supply bores 240 on the turbine-side bearing bushing 200. This leads to different lever arms of the lubricant inside the lubricant supply bores 140, 240 and thereby to different centrifugal forces and counter pressures in the lubricant supply bores 140, 240 of the compressor-side bearing bushing 100 and of the turbine-side bearing bushing 200, respectively. This on the other hand affects lubricant throughput from the outer lubrication gaps 115, 215 towards the inner lubrication gaps 113, 213. Thereby, a smaller depth 134, 234 of the circumferential lubricant groove 130, 230 leads to a larger bore depth 144, 244 of the lubricant supply bore 140, 240 and therefore, to a higher centrifugal force and counter pressure. This effectuates a smaller lubricant throughput to the inner lubrication gap 113, 213 and thereby leads to higher lubricant temperatures in the inner lubrication gap 113, 213. Having a higher lubricant temperature leads to a lower viscosity of the lubricant in the inner lubrication gap 113, 213. As a consequence, the transmission of drive torque between the shaft 530 and the respective bearing bushing 100, 200 is reduced and therefore the respective bearing bushing 100, 200 rotates slower during operation. Analogously, when the shaft is decelerated, the respective bearing bushing 100, 200 is decelerated faster than the other bearing bushing 100, 200 which has a smaller depth 134, 234 of the circumferential lubricant groove 130, 230. Thereby, it is achieved that the rotational speeds of the bearing bushings 100, 200 differ in all (or at least in a majority) of possible operating conditions. In that, the superposition of natural frequencies of the lubricant can be disturbed, i.e. the synchronization effects can be prevented.

FIG. 3A shows a first configuration of the second embodiment, wherein the depth 134 of the compressor-side circumferential lubricant groove 130 is smaller than the depth 234 of the turbine-side circumferential lubricant groove 230. This is particularly advantageous as at the turbine-side which is anyway warmer and has higher mass, further heat increase should be prevented. Analogously to the explanations further above, more lubricant is supplied to the turbine-side bearing bushing 200 which results in a faster rotation of the turbine-side bearing bushing 200 during operation due to a reduced lubricant film temperature in the inner lubrication gap 213 of the turbine-side bearing bushing 200 compared to the compressor-side bearing bushing 100. Consequently, this leads in a synergetic way to an improved cooling effect on the turbine-side bearing bushing 200. In this exemplary configuration, the depth 134 of the compressor-side circumferential lubricant groove 130 is approximately 60% smaller than the depth 234 of the turbine-side circumferential lubricant groove 230. However, in other configurations, the depth 134 of the compressor-side circumferential lubricant groove 130 may be 5% to 90%, preferably 15% to 80% and most preferably 25% to 50% smaller than the depth 234 of the turbine-side circumferential lubricant groove 230.

In a different configuration of the second embodiment according to FIG. 3B, the depth 234 of the turbine-side circumferential lubricant groove 230 is smaller than the depth 134 of the compressor-side circumferential lubricant groove 130. Thereby, the lubricant throughput is reduced at the turbine-side bearing bushing 200 which leads to decreased drive torque transmission between the shaft 530 and the turbine-side bearing bushing 200 due to a higher lubricant film temperature in the inner lubrication gap 213 of the turbine-side bearing bushing 200 compared to the compressor-side bearing bushing 100. In this exemplary configuration, the depth 234 of the turbine-side circumferential lubricant groove 230 is approximately 60% smaller than the depth 134 of the compressor-side circumferential lubricant groove 130. However, in other configurations, the depth 234 of the turbine-side circumferential lubricant groove 230 may be 5% to 90%, preferably 15% to 80% and most preferably 25% to 50% smaller than the depth 134 of the compressor-side circumferential lubricant groove 130.

In alternative embodiments of the second embodiments (not shown in the figures), the number of circumferential lubricant grooves 230 may be different on the turbine-side from the number of circumferential lubricant grooves 130 on the compressor-side to achieve a similar effect. For instance, one of the bearing bushings 100, 200 may comprise one circumferential lubricant groove 130, 230 and the other bearing bushing 100, 200 may comprise two or three circumferential lubricant grooves 130, 230. It would also be possible to not provide any circumferential lubricant groove 130, 230 on one of the bearing bushings 100, 200 and one, two or three circumferential lubricant grooves 130, 230 on the other bearing bushing 100, 200.

Figure 4A:
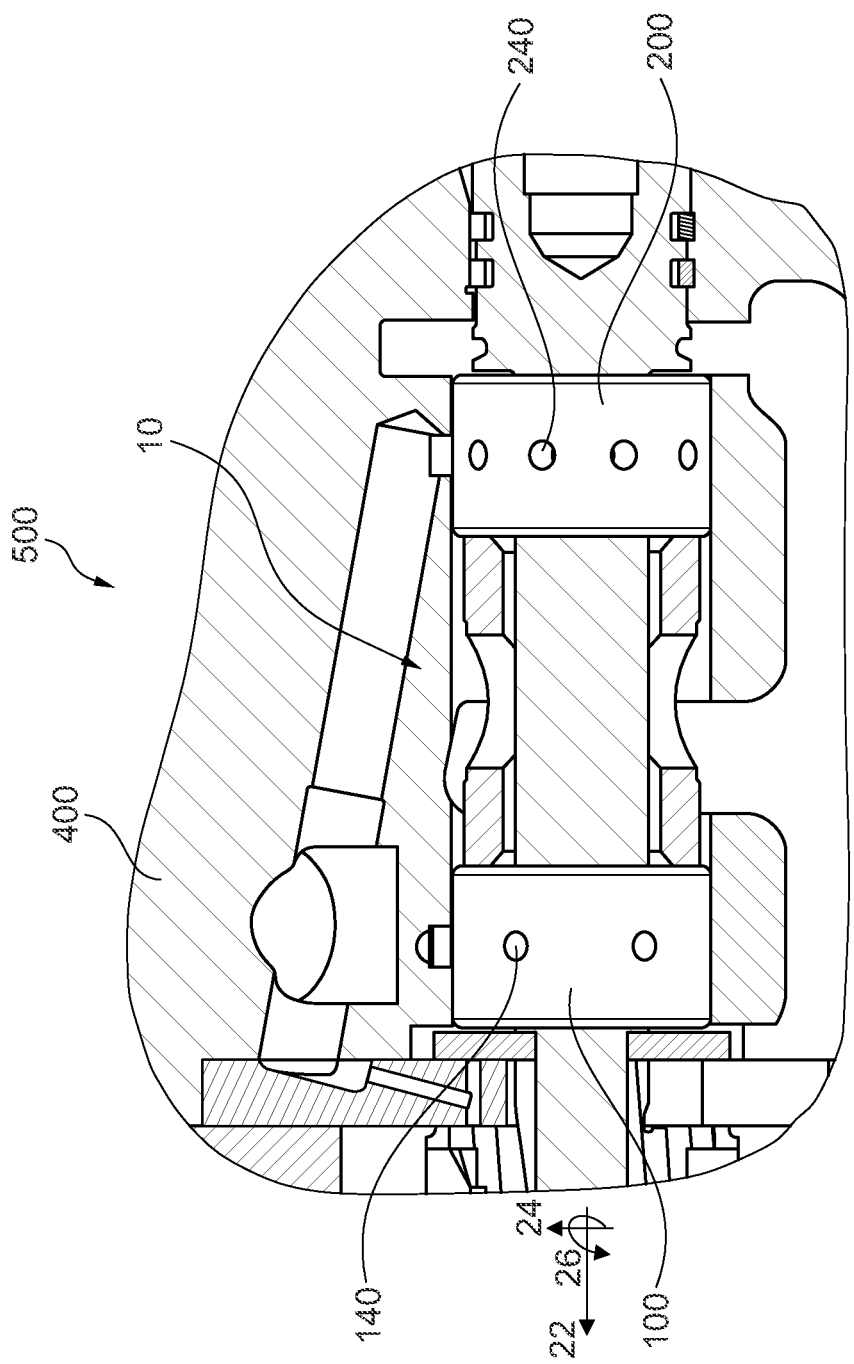
FIGS. 4A-4B show detailed sectional views of the bearing assembly according to a third embodiment with different numbers of lubricant supply bores.
Figure 4B:
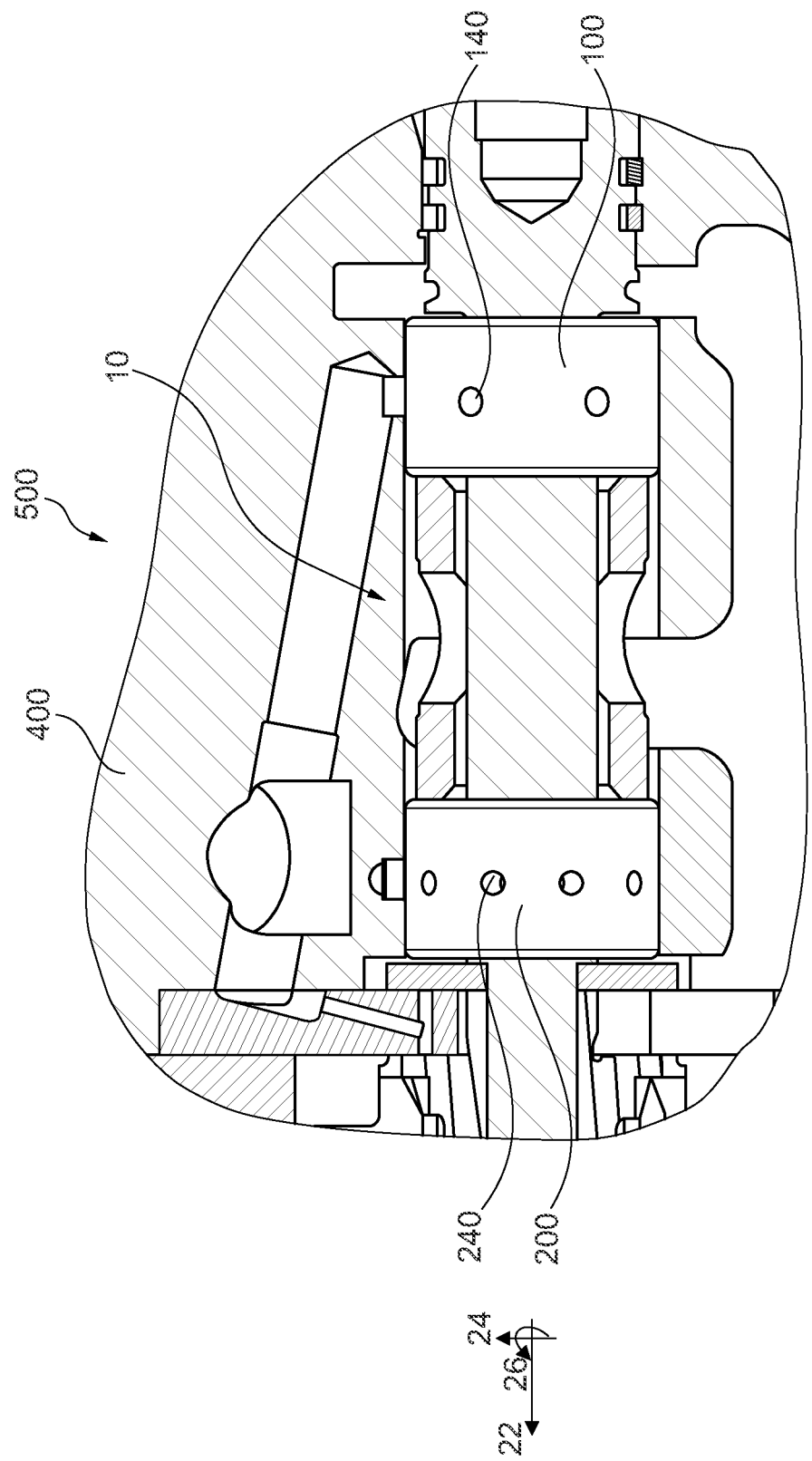

In the third embodiment which is depicted in FIGS. 4A-4B, a number of lubricant supply bores 140 of the compressor-side bearing bushing 100 is different than a number lubricant supply bores 240 of the turbine-side bearing bushing 200. In this regard, FIG. 4A shows an example configuration, wherein the compressor-side bearing bushing 100 comprises six lubricant supply bores 140 (although only two are visible) and wherein the turbine-side bearing bushing 200 comprises ten lubricant supply bores 240 (although only four are visible). On the other hand, FIG. 4B shows another example configuration, wherein the compressor-side bearing bushing 100 comprises ten lubricant supply bores 140 (although only four are visible) and wherein the turbine-side bearing bushing 200 comprises six lubricant supply bores 240 (although only two are visible). These numbers should merely represent example configurations. In any possible example, each bearing bushing 100, 200 at least comprises one lubricant supply bores 140, 240 and one of the bearing bushings 100, 200 comprises at least one lubricant supply bore 140, 240 more or less than the other bearing bushing 100, 200. In other configurations, one of the bearing bushings 100, 200 may, for instance, comprise four and the other bearing bushing 100, 200 may comprise six lubricant supply bores 140, 240. In further configurations, one of the bearing bushings 100, 200 may, for instance, comprise at least one, exactly one, two, three, four or five lubricant supply bores 140, 240 less than the other bearing bushing 100, 200. In further configurations, one of the bearing bushings 100, 200 may, for instance, comprise five and the other bearing bushing 100, 200 may comprise six lubricant supply bores 140, 240. In further configurations, one of the bearing bushings 100, 200 may, for instance, comprise five and the other bearing bushing 100, 200 may comprise ten lubricant supply bores 140, 240. In further configurations, one of the bearing bushings 100, 200 may, for instance, comprise four and the other bearing bushing 100, 200 may comprise eight lubricant supply bores 140, 240. In further configurations, one of the bearing bushings 100, 200 may, for instance, comprise two and the other bearing bushing 100, 200 may comprise four, five six or ten lubricant supply bores 140, 240. By the provision of different numbers of lubricant supply bores 140, 240 on the compressor-side bearing bushing 100, and on the turbine-side bearing bushing 200 a different lubricant throughput is achieved on the turbine-side than on the compressor-side. This results in different throttle effects from the outer circumference 114, 214 of the respective bearing bushing 100, 200 to the inner circumference 112, 212 of the respective bearing bushing 100, 200 and thereby leads to different amounts of lubricant in the inner lubrication gaps 113, 213. Consequently, different lubricant film temperatures and viscosities are built up in the inner lubrication gaps 113, 213 and thereby the transmission of drive torque between the shaft 530 and the bearing bushings 100, 200 is different which causes the bearing bushings 100, 200 to rotate at different speeds. In that, the superposition of natural frequencies of the lubricant can be disturbed, i.e. the synchronization effects can be prevented.

In the fourth embodiment which is depicted in FIG. 5, the first supply channel 424 opens into the inner surface 412 of the bearing bore 410 at an axial position of the compressor-side bearing bushing 100. As can also be seen in FIG. 5, the first supply channel 424 opens out into the inner surface 412 of the bearing bore 410 radially outside of the compressor-side bearing bushing 100. The second supply channel 426 opens out into the inner surface 412 of the bearing bore 410 axially between the compressor-side bearing bushing 100 and the turbine-side bearing bushing 200. More specifically, the second supply channel 426 opens into the inner surface 412 of the bearing bore 410 at an axial position of the spacer 300. The second supply channel 426 opens into the inner surface 412 of the bearing bore 410 radially outside of the spacer 300. In detail, the first supply channel 424 opens into the inner surface 412 via the first supply groove 425. The second supply channel 426 opens into the inner surface 412 via the second supply groove 427. Thereby, the lubricant supply can be improved. The first supply groove 425 and the second supply groove 427 are generally analogously arranged to the opening of the first supply channel 424 (i.e. at the axial position and radially outside of the compressor-side bearing bushing 100) and to the opening of the second supply channel 426 (i.e. at the axial position and radially outside of the spacer 300), respectively. In other words, the first supply groove 425 is arranged adjacent to the compressor-side outer jacket surface 124, in particular adjacent (preferably directly adjacent) to the compressor-side circumferential lubricant groove 130. The second supply groove 427 is arranged adjacent to the spacer outer jacket surface 324, in particular adjacent (preferably directly adjacent) to the axial position of the lubricant supply bore 340. The first supply groove 425 has approximately the same dimensions in the axial direction 22 as the opening of the first supply channel 424, whilst the second supply groove 427 has larger dimensions in the axial direction 22 than the opening of the second supply channel 426. In alternative configurations, the first supply groove 425 may also have larger dimensions in the axial direction 22 than the opening of the first supply channel 424 and/or the second supply groove 427 may have approximately the same dimensions in the axial direction 22 as the opening of the second supply channel 426. That means the first supply channel 424 is fluidically coupled directly to the compressor-side bearing bushing 100. The second supply channel 426 is fluidically coupled directly to the spacer 300. The bearing assembly 10 only comprises two supply channels 424, 426. As none of them opens into the inner surface 412 at an axial position of the turbine-side bearing bushing 200, the turbine side bearing bushing 200 is only supplied indirectly with lubricant, i.e. is only indirectly fluidly coupled with the lubricant supply channels 424, 426. The expressions "directly coupled or supplied directly" are to be understood in the meaning of providing lubricant to an axial position of the respective element (i.e. the bearing bushing 100, 200 or the space axially between bearing bushings 100, 200, i.e. spacer 300 in the present example), i.e. that at least a portion is radially surrounded by the opening of the lubricant supply channel 242, 426 and/or the lubricant supply groove 425, 427. The expressions "indirectly coupled or supplied indirectly" can be understand in the way of not providing lubricant to an axial position of the respective element (i.e. the bearing bushing 100, 200 or the space axially between bearing bushings 100, 200, i.e. spacer 300 in the present example), i.e. that not even a portion of the respective element is radially surrounded by the opening of the lubricant supply channel 242, 426 and/or the lubricant supply groove 425, 427. In this meaning, the compressor-side bearing bushing 100 is supplied with more lubricant than the turbine-side bearing bushing 200 which is only indirectly supplied with lubricant via the second supply channel 426. In particular, less lubricant is supplied to the outer lubrication gap 215 of the turbine-side bearing bushing 200. This leads to a higher lubricant temperature in this outer lubrication gap 215 and thereby to less breaking torque which causes the turbine-side bearing bushing 200 to rotate at a faster rotation speed during operation than the compressor-side bearing bushing 100. In that, the superposition of natural frequencies of the lubricant can be disturbed, i.e. synchronization effects can be prevented.

As already mentioned further above, the first supply channel 424 fluidically couples the lubricant chamber 422 directly to the compressor-side bearing bushing 100. The first supply channel 424 extends from the lubricant chamber 422 to the outer jacket surface 124 of the compressor-side bearing bushing 100, in particular via the first lubricant supply groove 425, to supply lubricant to the compressor-side outer jacket surface 124 and to the compressor-side circumferential lubricant groove 130 (see, FIG. 5). Further lubricant is thereby supplied to the compressor-side inner jacket surface 122 from the compressor-side circumferential lubricant groove 130 via the compressor-side lubricant supply bores 140. In other words, the first supply channel 424 extends from the lubricant chamber 422 towards the compressor-side circumferential lubricant groove 130 to supply lubricant to the compressor-side outer jacket surface 124 and to the compressor-side inner jacket surface 122 via the compressor-side lubricant supply bores 140.

The second supply channel 426 fluidically couples the lubricant chamber 422 directly to the spacer 300. The second supply channel 426 extends from the lubricant chamber 422 to the outer jacket surface 324 of the spacer 300, in particular via the second supply groove 427, to supply lubricant to the compressor-side outer jacket surface 124 and to the compressor-side circumferential lubricant groove 130 (see, FIG. 5). In other words, the second supply channel 426 extends from the lubricant chamber 422 towards the axial position of the lubricant supply bore 340 to supply lubricant to the spacer outer jacket surface 324 and to the spacer inner jacket surface 322 via the lubricant supply bores 340. In the example of FIG. 5, the second supply channel 426 extends from the lubricant chamber 422 to at least a portion of the axial position of the compressor-side land 332, in particular to an axial position between the compressor-side land 332 and the lubricant supply bore 340. In alternative configurations, the second supply channel 426 may extend from the lubricant chamber 422 to at least a portion of the axial position of the turbine-side land 334, in particular to an axial position between the turbine-side land 334 and the lubricant supply bore 340 (not depicted). In further alternative configurations, the second supply channel 426 may extend to the axial position of the turbine-side land 334 (i.e. to substantially the same axial position as the turbine-side land 334) or to the axial position of the compressor-side land 322 (i.e. to substantially the same axial position as the compressor-side land 322) without intercepting with the axial position of the lubricant supply bore 340, or to an axial position of the lubricant supply bore 340 (i.e. to substantially the same axial position as the lubricant supply bore 340) without intercepting with the axial position of the turbine-side land 334 and the compressor-side land 322.

Analogous configurations as described with respect to the second supply channel 426 account for the second supply groove 427. Thus, the second supply groove 427 is arranged at least at a portion of the axial position of the compressor-side land 332, in particular at an axial position between the compressor-side land 332 and the lubricant supply bore 340. That means, the second supply groove 427 is arranged adjacent or in an area between the compressor-side land 332 and the lubricant supply bore 340, i.e. partially adjacent to the compressor-side land 332 and partially adjacent to the lubricant supply bore 340 (see, FIG. 5). In alternative configurations, the second supply groove 427 may be arranged at least at a portion of the axial position of the turbine-side land 334, in particular at an axial position between the turbine-side land 334 and the lubricant supply bore 340. That means, the second supply groove 427 may be arranged adjacent or in an area between the turbine-side land 334 and the lubricant supply bore 340, i.e. partially adjacent to the turbine-side land 334 and partially adjacent to the lubricant supply bore 340 (not depicted in the figures). In further alternative configurations, the second supply groove 427 may be arranged at the axial position of the turbine-side land 334 (i.e. at substantially the same axial position as the turbine-side land 334) or at the axial position of the compressor-side land 322 (i.e. at substantially the same axial position as the compressor-side land 322) without intercepting with the axial position of the lubricant supply bore 340, or to at axial position of the lubricant supply bore 340 (i.e. at substantially the same axial position as the lubricant supply bore 340) without intercepting with the axial position of the turbine-side land 334 and the axial position of the compressor-side land 322.

Although, FIG. 5 only depicts the exemplary configuration wherein the first supply channel 424 opens into the inner surface 412 of the bearing bore 410 at the axial position of the compressor-side bearing bushing 100, in alternative configurations (not shown), the first supply channel 424 may open into the inner surface 412 of the bearing bore 410 at the axial position of the turbine-side bearing bushing 200. Thereby, all features explained above are analogously applicable to that configuration.

In general, any configuration of any embodiment can also be combined with any configuration of any other embodiment in order to increase the advantageous effects of disturbing synchronization effects.

| Reference sign list | |
|---|---|
| 10 | Bearing assembly |
| 22 | Axial direction |
| 24 | Radial direction |
| 26 | Circumferential direction |
| 100 | Compressor-side bearing bushing |
| 112 | Compressor-side inner circumference |
| 113 | Compressor-side inner lubrication gap |
| 114 | Compressor-side outer circumference |
| 115 | Compressor-side outer lubrication gap |
| 122 | Compressor-side inner jacket surface |
| 124 | Compressor-side outer jacket surface |
| 130 | Compressor-side circumferential lubricant groove |
| 134 | Compressor-side groove depth |
| 136 | Compressor-side groove width |
| 140 | Compressor-side lubricant supply bore |
| 144 | Compressor-side bore depth |
| 200 | Turbine-side bearing bushing |
| 212 | Turbine-side inner circumference |
| 213 | Turbine-side inner lubrication gap |
| 214 | Turbine-side outer circumference |
| 215 | Turbine-side outer lubrication gap |
| 222 | Turbine-side inner jacket surface |
| 224 | Turbine-side outer jacket surface |
| 230 | Turbine-side circumferential lubricant groove |
| 234 | Turbine-side groove depth |
| 236 | Turbine-side groove width |
| 240 | Turbine-side lubricant supply bore |
| 244 | Turbine-side bore depth |
| 300 | Spacer |
| 322 | Spacer inner jacket surface |
| 324 | Spacer outer jacket surface |
| 332 | Compressor-side spacer land |
| 334 | Turbine-side spacer land |
| 340 | Spacer lubricant supply bore |
| 400 | Bearing housing |
| 410 | Bearing bore |
| 412 | Inner surface of bearing bore |
| 420 | Lubricant supply system |
| 422 | Lubricant supply chamber |
| 424 | First supply channel |
| 425 | First supply groove |
| 426 | Second supply channel |
| 427 | Second supply groove |
| 500 | Charging apparatus |
| 510 | Compressor |

| | Reference sign list |
|---|---|
| 512 | Compressor housing |
| 514 | Impeller |
| 520 | Turbine |
| 522 | Turbine housing |
| 524 | Turbine wheel |
| 530 | Shaft |

It should be understood that the present invention can also (alternatively) be defined in accordance with the following configurations:

1. A bearing assembly (10) for a charging apparatus (500) comprising:
   a bearing housing (400),
   a shaft (530),
   a compressor-side bearing bushing (100) and a turbine-side bearing bushing (200) which together support the shaft (530) inside a bearing bore (410) of the bearing housing (400),
   characterized in that
   the bearing assembly (10) is configured to supply unequal amounts of lubricant to a compressor-side outer lubrication gap (115) of the compressor-side bearing bushing (100) and to a turbine-side outer lubrication gap (215) of the turbine-side bearing bushing (200), and/or in that
   the bearing assembly (10) is configured to supply unequal amounts of lubricant to a compressor-side inner lubrication gap (113) of the compressor-side bearing bushing (100) and to a turbine-side inner lubrication gap (213) of the turbine-side bearing bushing (200).
2. The bearing assembly (10) of configuration 1, wherein the compressor-side outer lubrication gap (115) is smaller than the turbine-side outer lubrication gap (215).
3. The bearing assembly (10) of any one of configurations 1 or 2, wherein the turbine-side outer lubrication gap (215) is at least 6.5% and preferably around 10% larger than the compressor-side outer lubrication gap (115).
4. The bearing assembly (10) of any one of the previous configurations, wherein the compressor-side inner lubrication gap (113) of the compressor-side bearing bushing (100) is equal to the turbine-side inner lubrication gap (213) of the turbine-side bearing bushing (200).
5. The bearing assembly (10) of any one of the previous configurations, wherein a depth (134) of a compressor-side circumferential lubricant groove (130) of the compressor-side bearing bushing (100) is different than a depth (234) of a turbine-side circumferential lubricant groove (230) of the turbine-side bearing bushing (200).
6. The bearing assembly (10) of configuration 5, wherein the depth (234) of the turbine-side circumferential lubricant groove (230) is smaller than the depth (134) of the compressor-side circumferential lubricant groove (130).
7. The bearing assembly (10) of any one of configurations 5 or 6, wherein the depth (234) of the turbine-side circumferential lubricant groove (230) is 5% to 90%, preferably 15% to 80% and most preferably 25% to 50% smaller than the depth (134) of the compressor-side circumferential lubricant groove (130).
8. The bearing assembly (10) of configuration 5, wherein the depth (134) of the compressor-side circumferential lubricant groove (130) is smaller than the depth (234) of the turbine-side circumferential lubricant groove (230).
9. The bearing assembly (10) of any one of configurations 5 or 8, wherein the depth (134) of the compressor-side circumferential lubricant groove (130) is 5% to 90%, preferably 15% to 80% and most preferably 25% to 50% smaller than the depth (234) of the turbine-side circumferential lubricant groove (230).
10. The bearing assembly (10) of any one of the previous configurations, wherein a number of lubricant supply bores (140) of the compressor-side bearing bushing (100) differs from a number lubricant supply bores (240) of the turbine-side bearing bushing (200).
11. The bearing assembly (10) of configuration 10, wherein the number of lubricant supply bores (140) of the compressor-side bearing bushing (100) is smaller than the number lubricant supply bores (240) of the turbine-side bearing bushing (200), and optionally, wherein the compressor-side bearing bushing (100) comprises at least one lubricant supply bore (140) less than the turbine-side bearing bushing (200).
12. The bearing assembly (10) of any one of configurations 10 or 11, wherein the compressor-side bearing bushing (100) comprises at least two lubricant supply bores (140) less than the turbine-side bearing bushing (200), and optionally, wherein the compressor-side bearing bushing (100) comprises four lubricant supply bores (140) and the turbine-side bearing bushing (200) comprises six lubricant supply bores (240).
13. The bearing assembly (10) of configuration 10, wherein the number lubricant supply bores (140) of the compressor-side bearing bushing (100) is larger than the number lubricant supply bores (240) of the turbine-side bearing bushing (200), and optionally, wherein the compressor-side bearing bushing (100) comprises at least one lubricant supply bore (140) more than the turbine-side bearing bushing (200).
14. The bearing assembly (10) of any one of configurations 10 or 13, wherein the compressor-side bearing bushing (100) comprises at least two lubricant supply bores (140) more than the turbine-side bearing bushing (200), and optionally, wherein the compressor-side bearing bushing (100) comprises six lubricant supply bores (140) and the turbine-side bearing bushing (200) comprises four lubricant supply bores (240).
15. The bearing assembly (10) of any one of the previous configurations, wherein the bearing housing (400) comprises a lubricant supply system (420) with a first supply channel (424) and a second supply channel (426), wherein the first supply channel (424) opens into an inner surface (412) of the bearing bore (410) at an axial position of the turbine-side bearing bushing (200) or at an axial position of the compressor-side bearing bushing (100) and wherein the second supply channel (426) opens into the inner surface (412) of the bearing bore (410) axially between the compressor-side bearing bushing (100) and the turbine-side bearing bushing (200).
16. The bearing assembly (10) of configuration 15, wherein the first supply channel (424) is fluidically coupled directly to one of the turbine-side bearing bushing (200) or the compressor-side bearing bushing (100) and wherein the second supply channel (426) is fluidically coupled directly to a spacer (300) which is arranged axially between the compressor-side bearing bushing (100) and the turbine-side bearing bushing (200).
17. The bearing assembly (10) of any one of configurations 15 or 16, wherein the lubricant supply system (420) further comprises a lubricant chamber (422), wherein the first supply channel (424) fluidically couples the lubricant chamber (422) directly to one of the turbine-side bearing bushing (200) or the compressor-side bearing bushing (100) and wherein the second supply channel (426) fluidically couples the lubricant chamber (422) directly to a spacer (300).
18. The bearing assembly (10) of configuration 17, wherein the second supply channel (426) extends from the lubricant chamber (422) to an outer jacket surface (324) of the spacer (300).
19. The bearing assembly (10) of any one of configurations 16 to 18, wherein the spacer (300) comprises a lubricant supply bore (340) which extends from the outer jacket surface (324) of the spacer (300) to an inner jacket surface (322) of the spacer (300).
20. The bearing assembly (10) of configuration 19, wherein the lubricant supply bore (340) is arranged axially between a compressor-side land (332) and a turbine-side land (334) of the spacer (300).
21. The bearing assembly (10) of any one of configurations 19 or 20, if dependent on configuration 17, wherein the second supply channel (426) extends from the lubricant chamber (422) to the lubricant supply bore (340) of the spacer (300).
22. The bearing assembly (10) of any one of configurations 20 or 21, if dependent on configuration 17, wherein the second supply channel (426) extends from the lubricant chamber (422) to the compressor-side land (332).
23. The bearing assembly (10) of any one of configurations 20 or 21, if dependent on configuration 17, wherein the second supply channel (426) extends from the lubricant chamber (422) to the turbine-side land (334).
24. The bearing assembly (10) of any one of configurations 15 to 23, wherein the first supply channel (424) extends to an outer jacket surface (224) of the turbine-side bearing bushing (200), in particular from the lubricant chamber (422) to the outer jacket surface (224) of the turbine-side bearing bushing (200).
25. The bearing assembly (10) of any one of configurations 15 to 23, wherein the first supply channel (424) extends to an outer jacket surface (124) of the compressor-side bearing bushing (100), in particular from the lubricant chamber (422) to the outer jacket surface (124) of the compressor-side bearing bushing (100).
26. The bearing assembly (10) of any one of configurations 15 to 25, wherein no direct lubricant supply is provided to one of the compressor-side bearing bushing (100) or the turbine-side bearing bushing (200).
27. The bearing assembly (10) of any one of configurations 15 to 26, wherein the first supply channel (424) opens into an inner surface of a first supply groove (425) provided on the inner surface (412) of the bearing bore (410) and/or wherein the second supply channel (426) opens into a second supply groove (427) provided on the inner surface (412) of the bearing bore (410).
28. The bearing assembly (10) of any one of the previous configurations, wherein each of the compressor-side bearing bushing (100) and the turbine-side bearing bushing (200) is a full-floating bushing type.
29. The bearing assembly (10) of any one of the previous configurations, wherein the shaft (530) rotatably couples a turbine wheel (524) of a turbine (520) to an impeller (514) of a compressor (510).
30. The bearing assembly (10) of any one of the previous configurations, further comprising a spacer (300) arranged axially between the compressor-side bearing bushing (100) and the turbine-side bearing bushing (200).
31. The bearing assembly (10) of any one of the previous configurations, wherein the compressor-side bearing bushing (100) and/or the turbine-side bearing bushing (200) comprise a plurality of lubricant supply bores (140, 240).
32. The bearing assembly (10) of any one of the previous configurations, wherein the compressor-side bearing bushing (100) and/or the turbine-side bearing bushing (200) comprise a circumferential lubricant groove (130, 230).
33. The bearing assembly (10) of any one of the previous configurations, wherein the bearing housing (400) comprises a first supply groove (425) provided on an inner surface (412) of the bearing bore (410) and/or a second supply groove (427) provided on the inner surface (412) of the bearing bore (410).
34. A charging apparatus (500) comprising:
a compressor (510) with a compressor housing (512) and an impeller (514) rotatable therein,
a drive unit which is rotatably coupled to the impeller (514) via a shaft (530) of the charging apparatus (500), characterized in that the charging apparatus further comprises a bearing assembly (10) of any one of the previous configurations which rotatably supports the shaft (530).
35. The charging apparatus (500) of configuration 34, wherein the drive unit comprises a turbine (520) and/or an electric motor configured to drive the shaft (530).

The invention claimed is:
1. A bearing assembly (10) for a charging apparatus (500) comprising:
a bearing housing (400),
a shaft (530),
a compressor-side bearing bushing (100) and a turbine-side bearing bushing (200) which together support the shaft (530) inside a bearing bore (410) of the bearing housing (400),
wherein the bearing housing (400) is configured to supply unequal amounts of lubricant to a compressor-side outer lubrication gap (115) between the compressor-side bearing bushing (100) and the bearing bore (410) and to a turbine-side outer lubrication gap (215) between the turbine-side bearing bushing (200) and the bearing bore (410), and/or in that
the compressor-side bearing bushing (100) and the turbine-side bearing bushing (200) are configured to supply unequal amounts of lubricant to a compressor-side inner lubrication gap (113) between the compressor-side bearing bushing (100) and the shaft (530) and to a turbine-side inner lubrication gap (213) between the turbine-side bearing bushing (200) and the shaft (530), and
wherein a depth (134) of a compressor-side circumferential lubricant groove (130) of the compressor-side bearing bushing (100) is different than a depth (234) of a turbine-side circumferential lubricant groove (230) of the turbine-side bearing bushing (200).
2. The bearing assembly (10) of claim 1, wherein the bearing housing (400) comprises a lubricant supply system (420) with a first supply channel (424) and a second supply channel (426), wherein the first supply channel (424) opens into an inner surface (412) of the bearing bore (410) at an axial position of one of the turbine-side bearing bushing (200) or the compressor-side bearing bushing (100) and wherein the second supply channel (426) opens into the inner surface (412) of the bearing bore (410) axially between the compressor-side bearing bushing (100) and the turbine-side bearing bushing (200).

3. The bearing assembly (10) of claim 2, wherein the first supply channel (424) is fluidically coupled directly to one of the turbine-side bearing bushing (200) or the compressor-side bearing bushing (100) and wherein the second supply channel (426) is fluidically coupled directly to a spacer (300) which is arranged axially between the compressor-side bearing bushing (100) and the turbine-side bearing bushing (200).

4. The bearing assembly (10) of claim 3, wherein the spacer (300) comprises a lubricant supply bore (340) which extends from an outer jacket surface (324) of the spacer (300) to an inner jacket surface (322) of the spacer (300), and wherein the lubricant supply bore (340) is arranged axially between a compressor-side land (332) and a turbine-side land (334) of the spacer (300).

5. The bearing assembly (10) of claim 4, wherein the second supply channel (426) extends from a lubricant chamber (422) to the lubricant supply bore (340) of the spacer (300).

6. The bearing assembly (10) of claim 4, wherein the second supply channel (426) extends from a lubricant chamber (422) to the compressor-side land (332), or wherein the second supply channel (426) extends from the lubricant chamber (422) to the turbine-side land (334).

7. The bearing assembly (10) of claim 2, wherein no direct lubricant supply is provided to the other of the compressor-side bearing bushing (100) or the turbine-side bearing bushing (200).

8. The bearing assembly (10) of any one of claim 2, wherein the first supply channel (424) opens into an inner surface of a first supply groove (425) provided on the inner surface (412) of the bearing bore (410) and/or wherein the second supply channel (426) opens into a second supply groove (427) provided on the inner surface (412) of the bearing bore (410).

9. The bearing assembly (10) of claim 2, wherein the lubricant supply system (420) further comprises a lubricant chamber (422), wherein the first supply channel (424) fluidically couples the lubricant chamber (422) directly to one of the turbine-side bearing bushing (200) or the compressor-side bearing bushing (100) and wherein the second supply channel (426) fluidically couples the lubricant chamber (422) directly to a spacer (300).

10. The bearing assembly (10) of claim 1, wherein the compressor-side outer lubrication gap (115) is smaller than the turbine-side outer lubrication gap (215).

11. The bearing assembly (10) of claim 1, wherein the depth (234) of the turbine-side circumferential lubricant groove (230) is smaller than the depth (134) of the compressor-side circumferential lubricant groove (130), or wherein the depth (134) of the compressor-side circumferential lubricant groove (130) is smaller than the depth (234) of the turbine-side circumferential lubricant groove (230).

12. The bearing assembly (10) of claim 1, wherein a number of lubricant supply bores (140) of the compressor-side bearing bushing (100) differs from a number of lubricant supply bores (240) of the turbine-side bearing bushing (200).

13. The bearing assembly (10) of claim 12, wherein the number of lubricant supply bores (140) of the compressor-side bearing bushing (100) is smaller than the number of lubricant supply bores (240) of the turbine-side bearing bushing (200).

14. The bearing assembly (10) of claim 12, wherein the compressor-side bearing bushing (100) comprises at least one lubricant supply bore (140) less than the turbine-side bearing bushing (200), or wherein the number of lubricant supply bores (140) of the compressor-side bearing bushing (100) is larger than the number of lubricant supply bores (240) of the turbine-side bearing bushing (200), and wherein the compressor-side bearing bushing (100) comprises at least one lubricant supply bore (140) more than the turbine-side bearing bushing (200).

15. The bearing assembly (10) of claim 1, wherein each of the compressor-side bearing bushing (100) and the turbine-side bearing bushing (200) is a full-floating bushing type.

16. A charging apparatus (500) comprising:
a compressor (510) with a compressor housing (512) and an impeller (514) rotatable therein,
a drive unit which is rotatably coupled to the impeller (514) via a shaft (530) of the charging apparatus (500), wherein the charging apparatus further comprises a bearing assembly (10) of claim 1 which rotatably supports the shaft (530), and wherein the drive unit comprises a turbine (520) configured to drive the shaft (530).

* * * * *